United States Patent
Kobayashi et al.

(10) Patent No.: US 6,735,612 B1
(45) Date of Patent: May 11, 2004

(54) CARRY SKIP ADDER

(75) Inventors: Yoshinao Kobayashi, Hiratsuka (JP); Akashi Satoh, Yamato (JP); Seiji Munetoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 09/699,976

(22) Filed: Oct. 30, 2000

Related U.S. Application Data (62) Division of application No. 09/102,532, filed on Jun. 22, 1998.

(30) Foreign Application Priority Data

Jun. 24, 1997 (JP) .............................................. 9-167292
Sep. 8, 1997 (JP) .............................................. 9-243091
Apr. 3, 1998 (JP) .............................................. 10-91837

(51) Int. Cl.$^7$ ................................................ G06F 7/50
(52) U.S. Cl. ..................................................... 708/706
(58) Field of Search ................................. 708/706–707, 708/710–713

(56) References Cited

U.S. PATENT DOCUMENTS

| | | | | |
|---|---|---|---|---|
| 4,737,926 A | * | 4/1988 | Vo et al. ...................... | 708/711 |
| 5,166,899 A | | 11/1992 | Lamb ......................... | 364/787 |
| 5,337,269 A | | 8/1994 | McMahan et al. .......... | 708/711 |
| 5,539,332 A | | 7/1996 | Schmookler ................ | 326/53 |
| 5,548,546 A | | 8/1996 | Jang et al. .................. | 708/706 |
| 5,912,833 A | | 6/1999 | Jang et al. .................. | 708/712 |

OTHER PUBLICATIONS

E.R. Barnes & V.G. Oklobdzija, "New Multilevel Scheme For Carry–Skip Addition", IBM Technical Disclosure Bulletin, vol. 27, No. 11, Apr. 1985, pp. 6785–6787.

A. Guyot et al., A Way to Build Efficient Carry–Skip Adders, IEEE Trans on Computers, vol. C–36, No. 10, Oct. 1987, pp. 1144–1152.

J. Millman and H. Taub, *Pulse and Switching Waveforms*, McGraw Hill, NY, 1965, pp. 338–340.

* cited by examiner

Primary Examiner—Tan V. Mai
(74) Attorney, Agent, or Firm—John R. Pivnichny (57) ABSTRACT

A carry skip adder has a plurality of ripple adders, in which at least one part of the plurality of ripple adders is divided into a plurality of groups, and a carry signal is transferred from one group to one upper group. In addition, a circuit for calculating $C=C2+F*C1$ is included, in which the C1 denotes a carry signal from the one group to the one upper group, and the F denotes a signal indicating whether or not outputs of all adders in the one upper group are 1s, and the C2 denotes a carry signal associated with the most upper ripple adder in the one upper group. In a group including two or more ripple adders, a plurality of ripple adders in the group are organized into a plurality of sub-groups, and a carry signal is transferred from one sub-group to one upper sub-group, a circuit for calculating $C5=C4+F1*C3$ is included, in which C3 denotes a carry signal from one sub-group to the one upper sub-group, and F1 denotes a signal indicating whether or not outputs of all adders in the one upper sub-group are 1s, and C4 denotes a carry signal associated with the most upper ripple adder in the one upper sub-group.

3 Claims, 6 Drawing Sheets

CARRY SKIP ADDER

This is a division of application Ser. No. 09/102,532, filed Jun. 22, 1998.

TECHNICAL FIELD

The present invention relates to a binary adder, and in particular to a multiple carry skip adder.

BACKGROUND OF THE INVENTION

A binary adder having multiple, 1024 to 2048, bits must be operated at high speed in order to process RSA encryption rapidly. However, according to a conventional technique, to be described below, the speed at which a binary adder can be operated is limited by a carry signal transmitted from a lower level, and a desirable operating speed can not be acquired. The conventional technique will now be described.

(1) Ripple Carry System

A ripple adder comprises parallel arranged full adders whose number is equivalent to that of the bits. But while a circuit required for a ripple carry system is not complicated, the maximum gate delay is equivalent to the total of the gate delays of the bits involved, and it is therefore very difficult to ensure a desirable operating speed.

(2) Carry Monitoring System

Since the maximum gate delay of the ripple adder is the maximum N stages for N bits, an ensured operating speed is reduced in inverse proportion to the number of bits. However, since the transfer of a carry is required only when two values, X and Y, to be added together are exclusively 1 and when a carry is transmitted from a lower level, these conditions are rarely sequential. For 1024 bits, as it is calculated that the above conditions happen for at most 11 sequential bits, the average operating speed is anticipated to be 100 times the ensured operating speed. In this system, a carry monitoring circuit is additionally provided to enter a waiting time when carries occur continuously. The carry monitoring system, however, requires a large circuit, and will increase power consumption and potentially will destabilize the operation.

(3) Carry Skip System

A binary adder is divided into several blocks to perform the addition in individual blocks, and a +1 compensation by a carry signal from a lower level. A binary adder according to this system is called a carry skip adder. Although it has a complicated circuit, the carry skip system requires only a small amount of power, and its operation is stable. The circuit for this system is more complicated than the ripple adder, and is as complicated as the adder for the carry monitor system.

In a one-stage carry step system, for the addition of N bits, n such that $N \leq n(n+2)/2+2$ is acquired and (n+3) is a gate delay for n. For 1024 bits, N=1024 and n=45, i.e., a gate delay of 48 is obtained.

The carry skip system is described in, for example, Information Processing, Vol. 37, No. 1 pp. 80–85, Information Processing Institute, January 1996.

Furthermore, two-stage carry skip adder is described in IBM Technical Disclosure Bulletin Vol. 27, No. 11, April 1985, pp. 6785–6787. Since a binary adder is divided into blocks symmetrically, the operating speed is high for a small number of bits, but as the effect of skipping carries is reduced when handling a lot of bits, the operating speed becomes relatively slower.

OBJECTS AND SUMMARY OF THE INVENTION

It is, therefore, one object of the present invention to provide a binary adder that has two or more carry-skipped stages to enable a higher operating speed.

It is another object of the present invention to provide a high-speed multiplier that employs the carry skip adder.

An N-stage carry skip adder ($N \geq 3$), which is a first form of the present invention, includes a plurality of ripple adders, wherein at least one part of the plurality of ripple adders is divided into a plurality of groups. A carry signal is transferred from one group to one upper group, and if a group includes a plurality of ripple adders, a carry signal is transferred between ripple adders in the group. In addition, a circuit for calculating C=C2+F*C1 is included, wherein the C1 denotes a carry signal from the one group to the one upper group, and the F denotes a signal indicating whether or not outputs of all adders in the one upper group are 1s, and the C2 denotes a carry signal associated with the most upper ripple adder in the one upper group.

Furthermore, if a group includes three or more ripple adders, the three or more ripple adders are organized into a plurality of groups at N−2 levels, the N-stage carry skip adder further comprises: a circuit for calculating $C2_1 = C4 + F2_0 * C3_0$; and a circuit for calculating $C2_{n+1} = C2_n + F2_n * C3_n$, wherein $1 \leq n \leq N-2$, and $C2^{N-1} = C2$, and said $C3_0$ denotes a carry signal transferred to the most upper ripple adder from a ripple adder in a group at a level 1 to which the most upper ripple adder belongs, and the level 1 is the lowest level, and the $C3_n$ ($1 \leq n \leq N-2$) denotes a carry signal transferred to a group at a level n to which the most upper ripple adder belongs from an adjacent group at the level n, and the C4 denotes a carry signal of the most upper ripple adder, and the $F2_0$ denotes a signal indicating whether or not outputs of all adder in the most upper ripple adder are 1s, and the $F2_n$ denotes a signal indicating whether or not outputs of all adders upper than a ripple adder associated with a circuit outputting said $C3_n$ and up to the most upper ripple adder are 1s.

By this configuration, the three or more-stage carry skip adder of the present invention can reduce a lot of gate delay. The carry signal is only transmitted to a upper adder, is never returned to a lower adder. In the three-stage carry skip adder, a plurality of ripple adders are further organized into groups at one level in addition to the primary grouping, and a circuit for calculating $C2_1 = C4 + F2_0 * C3_0$ and a circuit for calculating $C2_2 = C2 = C2_1 + F2_1 * C3_1$ are included. In the four-stage carry skip adder, a plurality of ripple adders are further organized into groups at two levels in addition to the primary grouping, a circuit for calculating $C2_1 = C4 + F2_0 * C3_0$, and a circuit for calculating $C2_2 = C2_1 + F2_1 * C3_1$, and a circuit for calculating $C2_3 = C2 = C4 + F2_2 * C3_2$ are included. The first form of the present invention indicates, for example, in FIG. 3, a set of AND circuit 435 and OR circuit 437, a set of AND circuit 441 and OR circuit 443, and a set of AND circuit 445 and OR circuit 447.

C=C2+F*C1, $C2_1 = C4 + F2_0 * C3_0$ and $C2_{n+1} = C2 = C2_n + F2_n * C3_n$ mean that a carry signal of a specific adder is generated when a carry is generated by the specific adder, or when all adders of a block including the specific adder have outputs of 1 and a carry is forwarded from a preceding block.

In the first form of the present invention, there is a phrase "one part of the plurality of ripple adders" because a simple ripple adder or an adder in a different system may be additionally provided at a lower or an upper level of the above configured carry skip adder. Particularly, in an adder used in a multiplier, a modified circuit of the present invention, that deals with two types of carries independently generated, is connected to the lower level of the adder of the present invention.

The number of ripple adders in the one upper group may be equal to or more than that of ripple adders in the one group. Therefore, even if the number of bits becomes large, the speed of the addition can be enhanced.

A carry skip adder, which is a second form of the present invention, includes a plurality of carry skip adders, and at least one part of the plurality of ripple adders is divided into a plurality of groups, and a carry signal is transferred from one group to one upper group. The carry skip adder further comprises a circuit for calculating C=C2+F*C1, wherein the C1 denotes a carry signal from the one group to the one upper group, and the F denotes a signal indicating whether or not outputs of all adders in the one upper group are 1s, and the C2 denotes a carry signal associated with the most upper ripple adder in the one upper group. In addition, if a group includes a plurality of ripple adders, a carry signal is transferred between ripple adders in the group, a circuit for calculating C2=C4+F2$_1$*C3$_1$ is included, wherein the C3$_1$ denotes a carry signal associated with a ripple adder one lower than the most upper ripple adder, and the C4 denotes a carry signal of the most upper ripple adder, and the F2$_1$ denotes a signal indicating whether or not outputs of all adders in the most upper ripple adder are 1s. The two-stage carry skip adder of the second form of the present invention can reduce a lot of gate delay. The carry signal is only transferred to the upper adder, is never returned to the lower adder. For example, in FIG. 1, a circuit for calculating C=C2+F*C1 is a set of AND circuit 71 and OR circuit 73, and a circuit for calculating C2=C4+F2$_1$*C3$_1$ is a set of AND circuit 67 and OR circuit 69. Note that in FIG. 1, a ripple adder including a half adder 11 and a full adder 13 and a ripple adder including a half adder 15 and a full adder 17 are organized into one group. Since this group includes two ripple adders, two carry signals exists, one transferred between groups, the other transferred within the group.

The second form of the present invention comprises: a circuit for EX-ORing the C and an output S0 of the lowest adder in the lowest ripple adder in a group one upper than the one upper group; and a circuit for EX-ORing the logical multiplication of the C and the S0 and an output S1 of an adder one upper than the lowest adder. The outputs of these exclusive OR (EX-OR) are a final output of the lowest adder and a final output of the adder one upper than the lowest adder, respectively.

A carry skip adder, which is a third form of the present invention, comprises: a plurality of ripple adders, wherein at least a part of the plurality of ripple adders comprises: a first ripple adder; a second ripple adder one lower than the first ripple adder; a circuit for calculating C2=C1+F1*C0 if a carry signal C0 with respect to the second ripple adder is delivered to the first ripple adder, wherein said C1 denotes a carry signal of the first ripple adder, and said F1 denotes a signal indicating whether or not all outputs in the first ripple adder are 1s; a third ripple adder two or more lower than the first ripple adder. If a carry signal C with respect to the third ripple adder is delivered from a circuit associated with the third ripple adder to the first ripple adder, a circuit for calculating C3=C2'+F2*C is included, wherein said F2 denotes a signal indicating whether or not all outputs of ripple adders from a ripple adder one higher than the third ripple adder to the first ripple adder are 1s, and a carry signal C2' is associated with the first ripple adder. The multiple-stage carry skip adder of the third form of the present invention can reduce a lot of gate delay. The carry signal is only delivered to the upper adder, is never returned to the lower adder. For example, if the first ripple adder is a set of adder 23 and 25 in FIG. 1, a circuit for calculating C2=C1+F1*C0 is a set of AND circuit 97 and OR circuit 103, and a circuit for calculating C3=C2'+F2*C is a set of AND circuit 101 and OR circuit 105.

If the C3 associated with the first ripple adder is outputted, a circuit for EX-ORing the C3 and an output S0 of the lowest adder in a fourth ripple adder one upper than the first ripple adder and a circuit for EX-ORing the logical multiplication of the C3 and the S0 and an output S1 of an adder one upper than the lowest adder are included. If the C3 associated with the first ripple adder is not outputted, a circuit for EX-ORing the C2 and an output S0 of the lowest adder in the fourth ripple adder and a circuit for EX-ORing the logical multiplication of the C2 and the S0 and an output S1 of an adder one upper than the lowest adder are included. These outputs of the exclusive OR (EX-OR) circuits are a final output of the lowest adder in the fourth ripple adder and a final output of the adder one upper than the lowest adder, respectively. For example, if the first ripple adder is a set of a half adder 15 and a full adder 17 in FIG. 1, the C3 is provided to the fourth ripple adder including a half adder 19 and a full adder 21. If the first ripple adder is a set of the half adder 19 and the full adder 21, the C2 is provided to a set of a half adder 23 and a full adder 25 (the fourth ripple adder).

If the fourth ripple adder includes three or more adders, a circuit for EX-ORing an output S$_m$ of an adder m (m≧3) upper than the lowest adder and the logical multiplication of the C3 and outputs of all adders from the lowest adder to an adder m−1 upper than the lowest adder is included. For example, if the first ripple adder is a set of a half adder 471 and a full adder 473 in FIG. 4, the fourth ripple adder is a set of a half adder 475 and full adders 477 and 479, and includes three adders. Then, the final output of the full adder 479 is exclusive OR of the output of the full adder 479 and the logical multiplication of outputs of adder 475 and 477 and the C3.

A carry skip adder, which is a fourth form of the present invention, comprises a plurality of ripple adders, wherein at least one part of the plurality of ripple adders is divided into a plurality of groups, and a carry signal is transferred from one group to one upper group. In addition, a circuit for calculating C=C2+F*C1 is included, wherein the C1 denotes a carry signal from the one group to the one upper group, and the F denotes a signal indicating whether or not outputs of all adders in the one upper group are 1s, and the C2 denotes a carry signal associated with the most upper ripple adder in the one upper group. In a group including two or more ripple adders, a plurality of ripple adders in the group are organized into a plurality of sub-groups, and a carry signal is transferred from one sub-group to one upper sub-group, a circuit for calculating C5=C4+F1*C3 is included, wherein the C3 denotes a carry signal from the one sub-group to the one upper sub-group, and the F1 denotes a signal indicating whether or not outputs of all adder in the one upper sub-group are 1s, and the C4 denotes a carry signal associated with the most upper ripple adder in the one upper sub-group. The group may have only one ripple adder, and the sub-group may have more sub-groups. For example, in FIG. 4, adders 451 through 479 are organized into one group, and adders 451 through 465 are organized into a first sub-group, and adders 467 through 479 are organized into a second sub-group. In addition, the first sub-group is divided into two sub-group, adders 451 through 457 and adders 459 through 465. The second sub-group is divided into three sub-groups, adders 467 and 469, adders 471 and 473, and adders 475 through 479. The two sub-groups in the first sub-group is divided into sub-groups each having only one ripple adder.

A modified carry skip adder of the first through fourth forms of the present invention comprises: a plurality of ripple adders, wherein an input of a least significant adder in at least a part of the plurality of ripple adders is three bits, and the part of the plurality of ripple adders comprises: a circuit for adding F1*C0 and C1 and F2 if a carry signal C0 with respect to an adder one lower than the least significant adder is transmitted to one ripple adder including the least significant adder, wherein C1 denotes a carry signal of the one ripple adder, and F1 denotes a signal indicating whether or not all outputs in the one ripple adder are 1, and F2 denotes a least significant output of a ripple adder one higher than the one ripple adder. Since two types of carries are independently generated, an addition circuit (a full adder) is employed.

For the two-stage carry skip adder, each of N-bit inputs are divided, from a lower level, into a first group having three bits, a second group having two bits, a third group having two 2-bit sets, and a fourth and following groups, wherein an n-th group (n is an integer of 4 or more) has n−1 sets, and in the n-th group, a first and a second set in the n-th group has two bits each, and an m-th set (m is an integer of 3 or more) has m bits. The two-stage carry skip adder comprises N adders. Each adder is connected to two input at the same bit positions of the two N-bit inputs. A ripple carry is directly transmitted from an adder to a succeeding adder in the first and second groups and in each said set. By this, ripple adders divided into a plurality of blocks are arranged. In addition, two skipped carries are forwarded by a line for transmitting a carry from a set to a succeeding set in each the group of the third group and following groups and a line for transmitting a carry from a group to a succeeding group in each the group of the second group and following groups. Finally, a circuit for correcting the result of the addition by using a transmitted carry and the output of said adder is provided. The number of the circuit is not limited to one, is typically plural. The feature of the adder is the division of ripple adders into blocks.

For a three-stage carry skip adder, each of two N-bit inputs is divided into, from a lower level, a first class having three bits, a second class having two bits, a third class having two 2-bit groups, a fourth class having a first group having two 2-bit sets and a second group having two 2-bit sets, a fifth class having a first group having two 2-bit sets, a second group having two 2-bit sets and a third group having two 2-bit sets and a 3-bit set, a sixth and following classes, wherein an n-th class (n is an integer of 6 or more) has n−2 groups, and in the n-th class, a first and second and third groups are the same as the respective groups in the fifth class, and a g-th group (g is an integer of 4 or more) has g sets, and in the g-th group, a first set has two bits and an s-th set (s is an integer of 2 or more) has s bits. The three-stage carry skip adder comprises N adders. Each of the adder is connected to two input at the same bit positions of the two N-bit inputs. A ripple carry is directly transmitted from an adder to a succeeding adder in the first and second classes and in each group of the third class, and in each set. By this, ripple adders divided into a plurality of blocks are arranged. In addition, three skipped carries are forwarded by a line for transmitting a carry from a set to a next set in each group of the third and following classes, and a line for transmitting a carry from a group to a next group in each class of the fourth and following classes and a line for transmitting a carry from a class to a next class in each class of the second and following classes. Finally, a circuit for correcting the result of the addition by using a transmitted carry and the output of the adder is provided.

For a four-stage carry skip adder, each of two N-bit inputs is divided into, from a lower level, a first block having three bits, a second block having two bits, a third block having two 2-bit sets, a fourth block having two classes each comprising two groups composed of two 2-bit sets each, a fifth and following blocks, wherein an b-th block (b is an integer of 5 or more) has b−2 classes, and in the b-th block, classes up to a b−3-th class are the same as corresponding classes in the previous block, and a b−2-th class has b−2 groups, and in b−2-th class, a first group has two 2-bit sets, a second group has two 2-bit sets and a g-th group (g is an integer of 3 or more) has g sets, and in the g-th group, a first set has two bits and an s-th set (s is an integer of 2 or more) has s bits.

Each of N adders is connected to two input at the same bit positions of said two N-bit inputs. A ripple carry is directly transmitting from an adder to a succeeding adder in the first and the second blocks and in each set of the third and following blocks. This is a ripple adder divided into blocks. Three skipped carries are forwarded by a line for transmitting a carry from a set to a succeeding set in the third block and in each group of the fourth and following blocks, and a line for transmitting a carry from a group to a succeeding group in each class of the fourth and following blocks, and a line for transmitting a carry from a class to a succeeding class in each of the fourth and following blocks, and a line for transmitting a carry from a block to a succeeding block in each of the second and following blocks. Finally, a circuit for correcting the result of the addition by using a transmitted carry and the output of the adder is provided.

BEST MODE FOR CARRYING OUT THE INVENTION

A. Two-stage Carry Skip Adder

First, the block division of the input will be explained. The following numerals indicate the number of binary adders.

---

3
2
2, 2
2, 2, 3
2, 2, 3, 4
2, 2, 3, 4, 5
. . . .
. . . .

---

Each line indicates a group obtained by the block division at an upper level. The numerals in a row indicate the number of sets obtained by block division at the group level.

Figure 1:
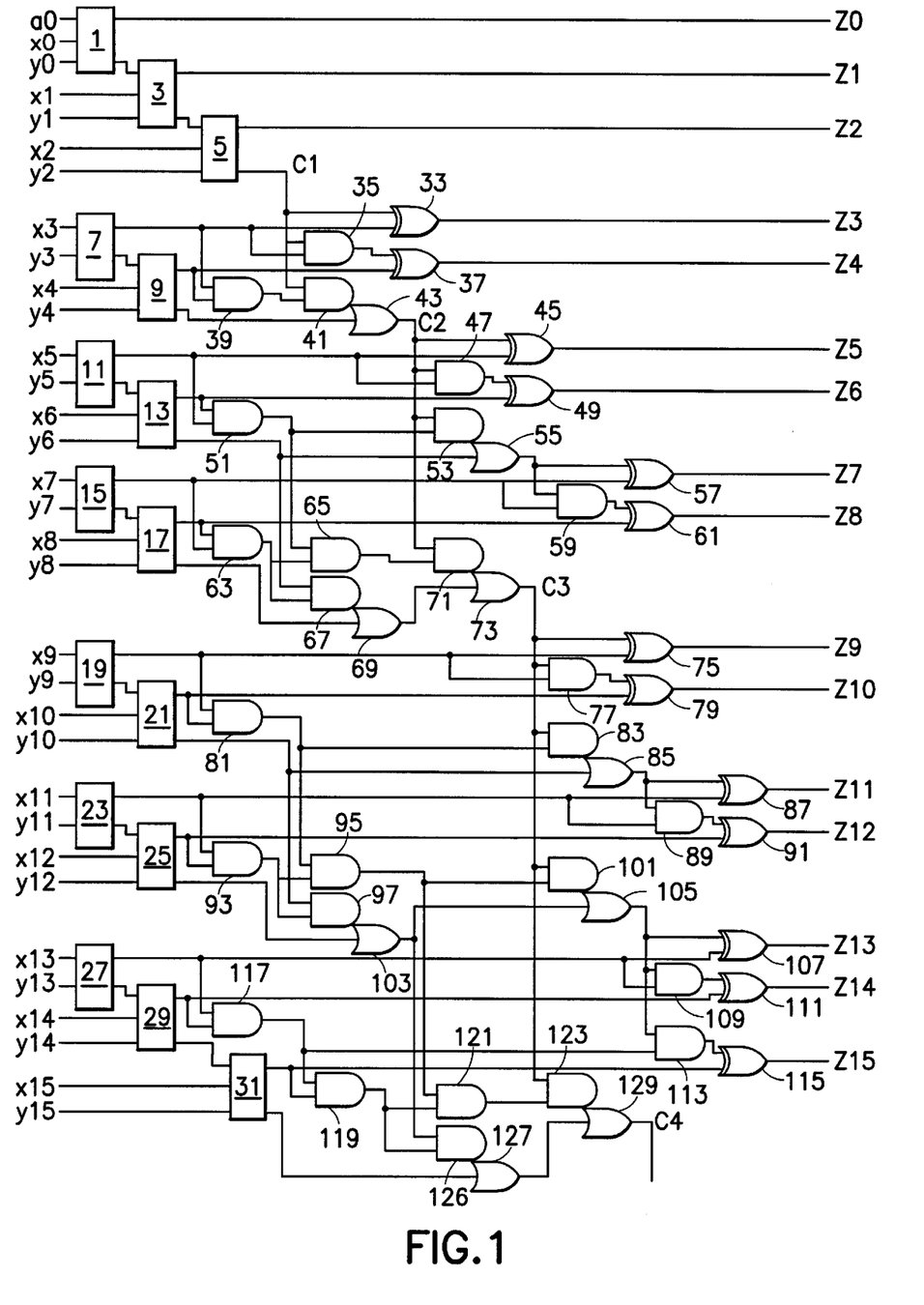
FIG. 1 is a circuit diagram for a two-stage carry skip adder.
Figure 2:
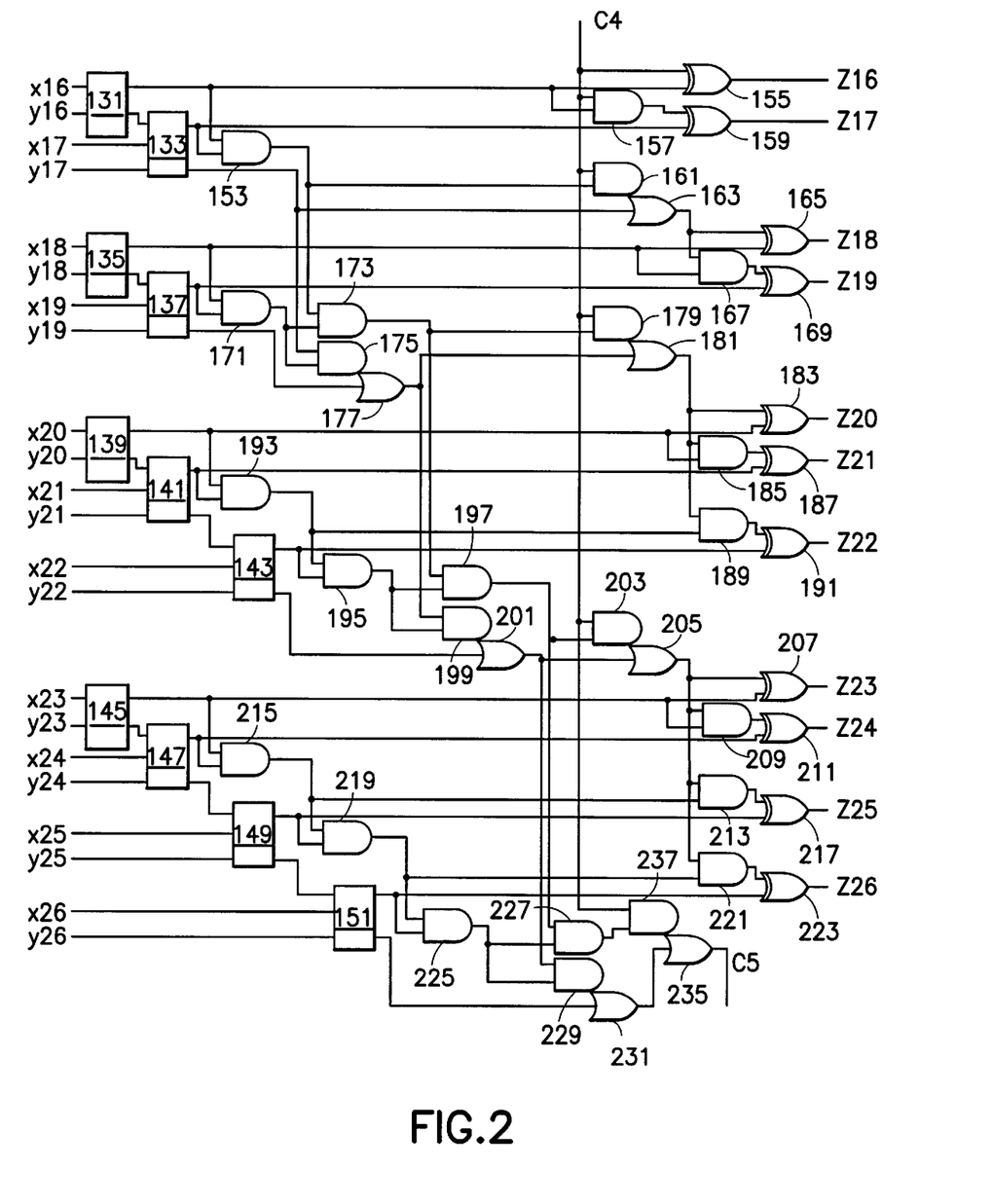
FIG. 2 is a circuit diagram for the two-stage carry skip adder.

A two-stage carry skip adder is shown in FIGS. 1 and 2. A first group includes three full adders, 1, 3 and 5, that constitute a ripple adder. That is, a carry of the full adder 1 is input to the full adder 3, and a carry of the full adder 3 is input to the full adder 5. The full adder 1 also receives signal but this is arbitrary, and the adder 1 may be a half adder. The outputs of the adders 1, 3 and 5 are Z0, Z1 and Z2, respectively. A carry signal C1 of the first group is output to the second group. Since the least significant group does not receive a carry from a lower level, a gate delay here can be one stage deeper.

A second group includes a half adder 7 and a full adder 9 that together constitute a ripple adder. A carry of the half adder 7 is input to the full adder 9. An exclusive-OR circuit 33 receives the output of the half adder 7 and the carry signal C1, and outputs Z3. The carry signal C1 and the output of the half adder 7 are transmitted to an AND circuit 35. An exclusive-OR circuit 37 receives the output of the AND circuit 35 and the output of the full adder 9, and outputs Z4. An AND circuit 39, for receiving the outputs of the adders 7 and 9; an AND circuit 41, for receiving the output of the AND circuit 39 and the carry signal C1; and an OR circuit 43, for receiving the output of the AND circuit 41 and a carry from the full adder 9, are provided in order to generate a carry signal C2 of the whole second group. The generated carry signal C2 is delivered to a third group. The second group receives only one carry signal C1 from the first group, and the AND circuit 39 and the AND circuit 41 and the OR circuit 43, generate the carry signal C2. The carry signal C2 is generated when all the adders in the group have outputs of 1 and the carry from the previous group is 1, or when the most significant adder in the group generates a carry.

The third group has two sets; a first set including a half adder 11 and a full adder 13, and a second set including a half adder 15 and a full adder 17. Each set serves as a ripple adder, and a carry is transmitted from the half adder 11 to the full adder 13, and from the half adder 15 to the full adder 17. An exclusive-OR circuit 45 receives the output of the half adder 11 and the carry signal C2, and outputs Z5. An AND circuit 47 receives the carry signal C2 and the output of the half adder 11. An exclusive-OR circuit 49 receives the output of the AND circuit 47 and the output of the full adder 13, and outputs Z6. A carry of the full adder 13 is transmitted as a carry of the first set to the second set. An AND circuit 51 is provided for generating a signal indicating whether or not the outputs of the adders 11 and 13 included in the first set are 1s. The output of the AND circuit 51 is also transmitted to the second set.

An AND circuit 53 which receives the carry signal C2 and the output of the AND circuit 51 and an OR circuit 55 which receives the output of the AND circuit 53 and a carry of the full adder 13 generate a carry signal up to the first set as a whole. An exclusive-OR circuit 57 receives the output of the OR circuit 55 and the output of the half adder 15, and outputs Z7. An AND circuit 59 receives the output of the OR circuit 55 and the output of the half adder 15. An exclusive-OR circuit 61 receives the output of the AND circuit 59 and the output of the full adder 17, and outputs Z8. Then, the generation of a carry up to the second set in this group is performed. This carry is generated by an AND circuit 63 for determining whether the outputs of the adders 15 and 17 are 1s, an AND circuit 67 for receiving a carry from the full adder 13 and the output of the AND circuit 63, and an OR circuit 69 for receiving the output of the AND circuit 67 and a carry from the full adder 17. In addition, a carry signal C3 of the whole second group must be generated. The carry signal C3 is generated by an AND circuit 65 for receiving the outputs of the AND circuit 51 and the AND circuit 63, an AND circuit 71 for receiving the output of the AND circuit 65 and a carry signal C2, and an OR circuit 73 for receiving the output of the AND circuit 71 and the output of the OR circuit 69. The AND circuit 65 is provided to generate a signal indicating whether or not all the adders in the group have output 1s.

A fourth group has three sets. A first set includes a half adder 19 and a full adder 21, which constitute a ripple adder. A second set includes a half adder 23 and a full adder 25, which constitute another ripple adder. A third set includes a half adder 27 and full adders 29 and 31, which constitute an additional ripple adder.

An exclusive-OR circuit 75 receives the output of the half adder 19 and the carry signal C3, and outputs Z9. An AND circuit 77 also receives the output of the half adder 19 and the carry signal C3. An exclusive-OR circuit 79 receives the output of the AND circuit 77 and the output of the full adder 21, and outputs Z10. An AND circuit 81 receives the outputs of the adders 19 and 21, and transmits its output to the second set. In addition, a carry from the full adder 21 is also transmitted to the second set. A carry up to the first set as a whole is generated by an AND circuit 83 for receiving the carry signal C3 and the output of the AND circuit 81 and an OR circuit 85 for receiving the output of the AND circuit 83 and a carry of the full adder 21.

An exclusive-OR circuit 87 receives the output of the OR circuit 85, which is a signal corresponding to the carry up to the first set as a whole, and the output of the half adder 23, and outputs Z11. An AND circuit 89 receives the output of the OR circuit 85 and the output of the half adder 23. An exclusive-OR circuit 91 receives the outputs of the AND circuit 89 and the full adder 25, and outputs Z12.

An AND circuit 93 for receiving the outputs of the adders 23 and 25, an AND circuit 97 for receiving the output of the AND circuit 93 and the output of the full adder 21, and an OR circuit 103 for receiving the output of the AND circuit 97 and a carry from the full adder 25 are provided in order to generate a carry up to the second set in the fourth group. In addition, an AND circuit 95, which receives the output of the AND circuit 81 and the output of the AND circuit 93, generates a signal indicating whether all the adders in the first and the second sets have output 1s. The output of the AND circuit 95 and the output of the OR circuit 103 are transmitted to the third set.

An AND circuit 101 for receiving the carry signal C3 and the output of the AND circuit 95 and an OR circuit 105 for receiving the outputs of the AND circuit 101 and the OR circuit 103 generate a carry up to the second set as a whole. An exclusive-OR circuit 107 receives the output of the OR circuit 105 and the output of the half adder 27, and outputs Z13. An AND circuit 109 also receives the output of the OR circuit 105 and the output of the half adder 27. An exclusive-OR circuit 111 receives the output of the AND circuit 109 and the output of the full adder 29, and outputs Z14.

An AND circuit 117 receives the outputs of the adders 27 and 29, and an AND circuit 113 receives the output of the AND circuit 117 and the output of the OR circuit 105. An exclusive-OR circuit 115 receives the output of the AND circuit 113 and the output the full adder 31, and outputs Z15.

An AND circuit 119 for receiving the outputs of the AND circuit 117 and the full adder 31, an AND circuit 125 for receiving the output of the AND circuit 119 and the output of the OR circuit 103, which is a carry up to the second set in the fourth group, and an OR circuit 127 for receiving the output of the AND circuit 125 and a carry of the full adder 31 are provided in order to generate a carry up to the third set in the fourth group.

In addition, a circuit for generating a carry signal C4 up to the fourth group as a whole is provided. This circuit includes an AND circuit 121, for receiving the output of the AND circuit 95, which is a signal indicating whether all the adders up to the second set have output 1s, and the output of the AND circuit 119; an AND circuit 123 for receiving the output of the AND circuit 121 and the carry signal C3; and an OR circuit 129 for receiving the output of the AND circuit 123 and the output of the OR circuit 127, which is a carry up to the third set. The carry signal C4 is transmitted to a circuit in FIG. 2 (fifth group).

The fifth group shown in FIG. 2 includes four sets. A first set includes a half adder 131 and a full adder 133 that serve as a ripple adder. A second set includes a half adder 135 and a full adder 137 that serve as a ripple adder. A third set includes a half adder 139 and full adders 141 and 143 that serve as a ripple adder. And a fourth set includes a half adder 145 and full adders 147, 149 and 151.

An exclusive-OR circuit 155 receives the output of the half adder 131 and the carry signal C4, and outputs Z16. An AND circuit 157 also receives the output of the half adder 131 and the carry signal C4. An exclusive-OR circuit 159 receives the output of the AND circuit 157 and the output of the full adder 133, and outputs Z17. An AND circuit 153 receives the outputs of the adders 131 and 133, and the output of the AND circuit 153 and the output of the full adder 133 are transmitted to the second set.

An AND circuit 161, for receiving the carry signal C4 and the output of the AND circuit 153, and an OR circuit 163, for receiving the output of the AND circuit 161 and a carry from the full adder 133, are provided in order to generate a carry from the first group up to the first set of the fifth group. An exclusive-OR circuit 165 receives the output of the OR circuit 163 and the output of the half adder 135, and outputs Z18. An AND circuit 167 also receives the output of the OR circuit. 163 and the output of the half adder 135. An exclusive-OR circuit 169 receives the output of the AND circuit 167 and the output of the full adder 137, and outputs Z19.

An AND circuit 171 for receiving the outputs of the adders 135 and 137, an AND circuit 175 for receiving the output of the AND circuit 171 and a carry of the full adder 133, and an OR circuit 177 for receiving the output of the AND circuit 175 and a carry of the full adder 137 are provided in order to generate a carry up to the second set in the fifth group. The generated carry up to the second set in the fifth group is transmitted to the third set. Furthermore, an AND circuit 173 for receiving the outputs of the AND circuits 153 and 171 is provided to generate a signal indicating whether or not all the adders up to the second set have output 1s. The output of the AND circuit 173 is also transmitted to the third set.

An AND circuit 179 for receiving the carry signal C4 and the output of the AND circuit 173, which is a signal indicating whether or not all the adders up to the second set have output 1s, and an OR circuit 181 for receiving the output of the AND circuit 179 and the output of the OR circuit 177, which is the carry up to the second set, are provided in order to generate a carry from the first group up to the second set in the fifth group. An exclusive-OR circuit 183 receives the output of the OR circuit 181 and the output of the half adder 139, and outputs Z20. An AND circuit 185 receives the output of the OR circuit 181 and the output of the half adder 139. An exclusive-OR circuit 187 receives the output of the AND circuit 185 and the output of the full adder 141, and outputs Z21.

An AND circuit 193 receives the outputs of the adders 139 and the 141, and an AND circuit 189 receives the output of the AND circuit 193 and the output of the OR circuit 181. An exclusive-OR circuit 191 receives the output of the AND circuit 189 and the output of the full adder 143, and outputs Z22.

An AND circuit 195 for receiving the outputs of the full adder 143 and the AND circuit 193, an AND circuit 199 for receiving the output of the AND circuit 195 and the output of the OR circuit 177, which is the carry up to the second set in the fifth group, and an OR circuit 201 for receiving the output of the AND circuit 199 and a carry of the full adder 143 are provided in order to generate a carry up to the third set in the fifth group. Furthermore, an AND circuit 197, for receiving the output of the AND circuit 173 from the second set and the output of the AND circuit 195, is provided in order to generate a signal indicating whether or not all the adders in the first through the third sets have output 1s. The output of the AND circuit 197 and a carry up to the third set in the fifth group, which is the output of the OR circuit 201, are transmitted to the fourth set.

An AND circuit 203, for receiving the carry signal C4 and the output of the AND circuit 197, and an OR circuit 205, for receiving the output of the AND circuit 203 and the output of the OR circuit 201, which is a carry up to the third set in the fifth group, are provided in order to generate a carry from the first group up to the third set in the fifth group. An exclusive-OR circuit 207 receives the output of the OR circuit 205 and the output of the half adder 145, and outputs Z23. An AND circuit 209 also receives the outputs of the OR circuit 205 and the half adder 145. An exclusive-OR circuit 211 receives the output of the AND circuit 209 and the output of the full adder 147, and outputs Z24.

An AND circuit 215 receives the outputs of the adders 145 and 147, and an AND circuit 213 receives the output of the AND circuit 215 and the output of the OR circuit 205. An exclusive-OR circuit 217 receives the output of the AND circuit 213 and the output of the full adder 149, and outputs Z25. An AND circuit 219 receives the outputs of the full adder 149 and of the AND circuit 215, and an AND circuit 221 receives the output of the AND circuit 219 and the output of the OR circuit 205. An exclusive-OR circuit 223 receives the output of the AND circuit 221 and the output of the full adder 151, and outputs Z26.

An AND circuit 225 for receiving the outputs of the AND circuit 219 and the full adder 151, an AND circuit 229 for receiving the output of the AND circuit 225 and the output of the OR circuit 201, which is a carry up to the third set, and an OR circuit 231 for receiving the output of the AND circuit 229 and a carry from the full adder 151 are provided in order to generate a carry up to the fourth set in the fifth group. Furthermore, an AND circuit 227 for receiving the outputs of the AND circuit 197 and the AND circuit 225, an AND circuit 237 for receiving the output of the AND circuit 227 and the carry signal C4, and an OR circuit 235 for receiving the output of the AND circuit 237 and the output of the OR circuit 231, which is a carry up to the fourth set, are provided in order to output a carry signal C5 from the fifth group to a sixth group. The output of the OR circuit 235 is the carry signal C5 of the fifth group.

The above arrangement is for a circuit having 26 bits, and the circuits followed by FIG. 2 can be provided by employing the previously mentioned block division method.

In the circuit in FIGS. 1 and 2, the full adder 1 and the other half adders begin addition without taking preceding carries into account, and the first and the second groups and the individual sets of the third and following groups perform addition using a ripple carry method. Then, the exclusive-OR, AND and OR circuits perform their processing, and generate the results.

In particular, it should be noted that a circuit for generating a carry up to a pertinent set in a pertinent group, and a circuit for generating a carry taking into account all the sets including the pertinent set (including the preceding groups) are provided for each set in the third and following groups. The former circuit is constituted by one or more AND circuits for generating a signal F1 indicating whether all the adders in a specific set have output 1s, a second AND circuit for receiving a carry C0 from the preceding set and the output F1, and an OR circuit for receiving the output of the second AND circuit and a ripple carry C1 of the specific set. These circuits are expressed as C2=C1+F1*C0. The latter circuit is constituted by one or more AND circuits for generating a signal F2 indicating whether or not all the adders up to a pertinent set in a group have output 1s, a second AND circuit for receiving the output F2 and a carry signal C from the preceding group, and an OR circuit for receiving the output of the second AND circuit and a carry C2' relevant to the pertinent set. These circuits are expressed as C3=C2'+F2*C.

The arrangements in FIGS. 1 and 2 are described using positive logic, but can be described using negative logic. In this case, AND and OR circuits would be replaced with NAND and NOR circuits. Therefore, a circuit other than that shown in FIGS. 1 and 2 can perform substantially the same processing, and the above expressions may also be modified so long as substantially the same processing can be performed.

For the two-stage carry skip adder, the total gate delay is (n+5), where n satisfies bit count $N \leq n(n+1)(n+2)/6+n+3$. The relationship between n and N is shown below.

| n | N |
|---|---|
| 4 | 27 |
| 5 | 43 |
| 6 | 65 |
| 7 | 94 |
| 8 | 131 |
| 9 | 177 |
| . | . . |
| 17 | 989 |
| 18 | 1161 |
| . . | . . . |
| 22 | 2049 |

Therefore, the two-stage carry skip adder has a gate delay of 23 for 1024 bits and has a gate delay of 27 for 2048 bits.

B. Three-stage Carry Skip Adder

The block division method used for three carry skipping stages is shown below.

```
           3
           --
           2
           ---
          2, 2
          -----
          2, 2
          2, 2
          -----
          2, 2
          2, 2
         2, 2, 3
          ------
          2, 2
          2, 2
         2, 2, 3
        2, 2, 3, 4
          -------
```

The horizontal lines denote the most upper blocks (called classes). In the fourth and following classes, the rows denote the group segmentation, The numbers in columns represent the block segmentation (called sets) in each group.

Figure 3:
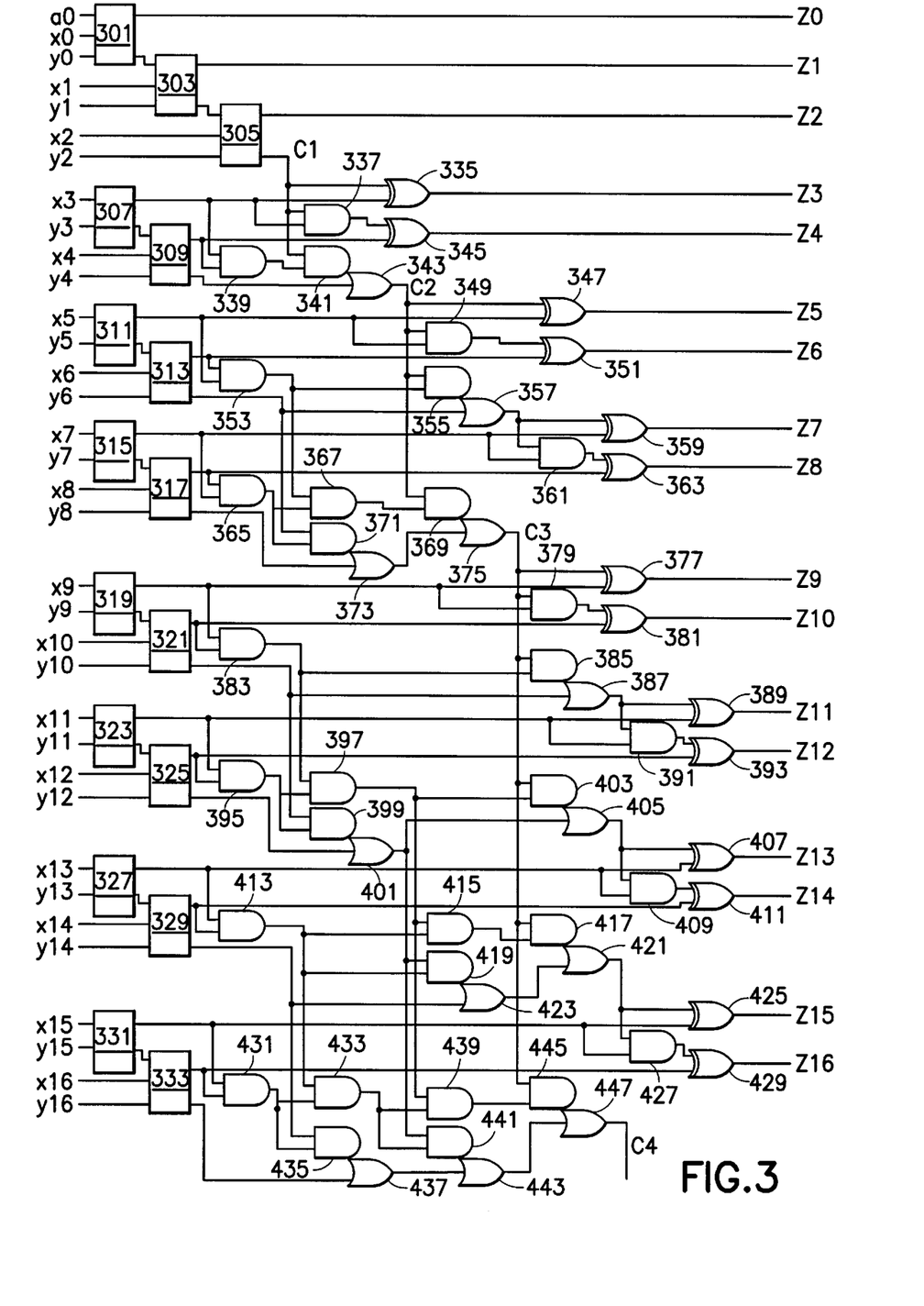
FIG. 3 is a circuit diagram for a three-stage carry skip adder.

This circuit is shown in FIG. 3. The first class includes full adders 301, 303 and 305 that constitute a ripple adder. The full adders 301, 303 and 305 respectively output Z0, Z1 and Z2. A signal a0 is input to the first full adder 301, but this is not necessary, and therefore, a half adder may be employed instead of the first full adder 301. A carry signal C1 of the full adder 305 is transmitted to the second class.

The second class includes a half adder 307 and a full adder 309 that constitute a ripple adder. An exclusive-OR circuit 335 receives the carry signal C1 and the output of the half adder 307, and outputs Z3. An AND circuit 337 also receives the output of the half adder 307 and the carry signal C1. An exclusive-OR circuit 345 receives the outputs of the AND circuit 337 and the full adder 309, and outputs Z4.

An AND circuit 339 receives the outputs of the adders 307 and 309, and an AND circuit 341 receives the output of the AND circuit 339 and the carry signal C1. An OR circuit 343 receives the output of the AND circuit 341 and a carry of the full adder 309, and generates a carry signal C2 up to the second class. The carry signal C2 is transmitted to the third class.

The third class includes two sets. A first set includes a half adder 311 and a full adder 313 that constitute a ripple adder, and a second set includes a half adder 315 and a full adder 317 that constitute a ripple adder.

An exclusive-OR circuit 347 receives the carry signal C2 and the output of the half adder 311, and outputs Z5. An AND circuit 349 also receives the output of the half adder 311 and the carry signal C2. An exclusive-OR circuit 351 receives the output of the AND circuit 349 and the output of the full adder 313, and outputs Z6.

An AND circuit 353 receives the outputs of the adders 311 and 313, and the output of the AND circuit 353 and a carry from the full adder 313 are transmitted to the second set.

An AND circuit 355, for receiving the output of the AND circuit 353 and the carry signal C2, and an OR circuit 357, for receiving the output of the AND circuit 355 and the output of the full adder 313, are provided in order to generate a carry from the first class up to the first set in the third class. An exclusive-OR circuit 359 receives the output of the OR circuit 357 and the output of the half adder 315, and outputs Z7. An AND circuit 361 receives the outputs of the OR circuit 357 and the half adder 315. An exclusive-OR circuit 363 receives the outputs of the AND circuit 361 and the full adder 317, and outputs Z8.

The outputs of the adders 315 and 317 are input to an AND circuit 365. An AND circuit 371, for receiving the output of the AND circuit 365 and a carry of the full adder 313, and an OR circuit 373, for receiving the outputs of the AND circuit 371 and the full adder 317, are provided in order to generate a carry up to the second set in the third class. Furthermore, an AND circuit 367 for receiving the outputs of the AND circuits 353 and 365 is provided in order to generate a signal indicating whether or not all the adders in the third class have output 1s. In addition, an AND circuit 369, for receiving the carry signal C2 and the output of the AND circuit 367, and an OR circuit 375, for receiving the outputs of the AND circuit 369 and the OR circuit 373, are provided in order to generate a carry signal C3 up to the third class. The output of the OR circuit 375 serves as the carry signal C3 of the third class. The carry signal C3 is also transmitted to the fourth class.

Up to this third class, the above arrangement is the same as the third group of the two-stage carry skip circuit.

The fourth class will now be explained. The fourth class includes two groups that each have two sets. A first set of a first group includes a half adder 319 and a full adder 321 that constitute a ripple adder, and a second set of the first group includes a half adder 323 and a full adder 325 that constitute a ripple adder. A first set of a second group includes a half adder 327 and a full adder 329 that constitute a ripple adder, and a second set of the second group includes a half adder 331 and a full adder 333 that constitute a ripple adder.

An exclusive-OR circuit 377 receives the output of the half adder 319 and the carry signal C3, and outputs Z9. An AND circuit 379 also receives the carry signal C3 and the output of the half adder 319. An exclusive-OR circuit 381 receives the outputs of the AND circuit 379 and the full adder 321, and outputs Z10. An AND circuit 383 receives the outputs of the adders 319 and 321, and the output of the AND circuit 383 and a carry from the full adder 321 are transmitted to the second set.

An AND circuit 385, for receiving the output of the AND circuit 383 and the carry signal C3, and an OR circuit 387, for receiving the outputs of the AND circuit 385 and the full adder 321, are provided in order to generate a carry from the first class up to the first set in the fourth class. An exclusive-OR circuit 389 receives the output of the OR circuit 387 and the output of the half adder 323, and outputs Z11. An AND circuit 391 receives the outputs of the OR circuit 387 and the half adder 323. An exclusive-OR circuit 393 receives the output of the AND circuit 391 and the output of the full adder 325, and outputs Z12.

An AND circuit 395 for receiving the outputs of the adders 323 and 325 is provided in order to generate a signal indicating whether or not the adders 323 and 325 in the second set have output 1s. Furthermore, an AND circuit 399, for receiving the output of the AND circuit 395 and a carry of the full adder 321 in the first set, and an OR circuit 401, for receiving the outputs of the AND circuit 399 and the full adder 325, are provided in order to generate a carry up to the second set, i.e., up to the first group. The carry of the first group is transmitted to the second group, and the output of the AND circuit 397 that receives the outputs of the AND circuits 383 and 395 is also delivered to the second group. The output of the AND circuit 397 is a signal indicating whether or not all the adders in the first group have output 1s.

An AND circuit 403, for receiving the output of the AND circuit 397 and the carry signal C3, and an OR circuit 405, for receiving the outputs of the AND circuit 403 and the OR circuit 401, are provided in order to generate a carry from the first class up to the first group in the fourth class. An exclusive-OR circuit 407 receives the output of the OR circuit 405 and the output of the half adder 327, and outputs Z13. An AND circuit 409 also receives the outputs of the OR circuit 405 and the half adder 327. An exclusive-OR circuit 411 receives the output of the AND circuit 409 and the output of the full adder 329, and outputs Z14.

An AND circuit 413 receives the outputs of the adders 327 and 329 in the first set of the second group. The outputs of the AND circuit 413 and the full adder 329 are transmitted to the second set of the second group. An AND circuit 419, for receiving the outputs of the AND circuit 413 and the OR circuit 401, and an OR circuit 423, for receiving the outputs of the AND circuit 419 and the full adder 329, are provided in order to generate a carry up to the first set of the second group in the fourth class.

Furthermore, an AND circuit 415, for receiving the outputs of the AND circuits 397 and 413, an AND circuit 417, for receiving the output of the AND circuit 415 and the carry signal C3, and an OR circuit 421, for receiving the outputs of the AND circuit 417 and the OR circuit 423, are provided in order to generate a carry from the first class up to the first set of the second group in the fourth class.

An exclusive-OR circuit 425 receives the outputs of the OR circuit 421 and the half adder 331, and outputs Z15. An AND circuit 427 also receives the outputs of the OR circuit 421 and the half adder 331. An exclusive-OR circuit 429 receives the outputs of the AND circuit 427 and the full adder 333, and outputs Z16.

The outputs of the adders 331 and 333 are transmitted to an AND circuit 431 in order to generate a signal indicating whether or not the adders in the second set of the second group have output 1s. Further, an AND circuit 435, for receiving the output of the AND circuit 431 and a carry of the full adder 329, and an OR circuit 437, for receiving the output of the AND circuit 435 and a carry of the full adder 333, are provided in order to generate a carry of the second group.

In addition, an AND circuit 433, for receiving the outputs of the AND circuits 413 and 431, an AND circuit 441, for receiving the outputs of the AND circuit 433 and the OR circuit 401, and an OR circuit 443, for receiving the outputs of the AND circuit 441 and the OR circuit 437, are provided in order to generate a carry of the first and the second groups.

Furthermore, an AND circuit 439, for receiving the outputs of the AND circuits 397 and 433, an AND circuit 445, for receiving the output of the AND circuit 439 and the carry signal C3, and an OR circuit 447, for receiving the outputs of the AND circuit 445 and the OR circuit 443, are provided in order to generate a carry signal C4 up to the fourth class as a whole.

Figure 4:
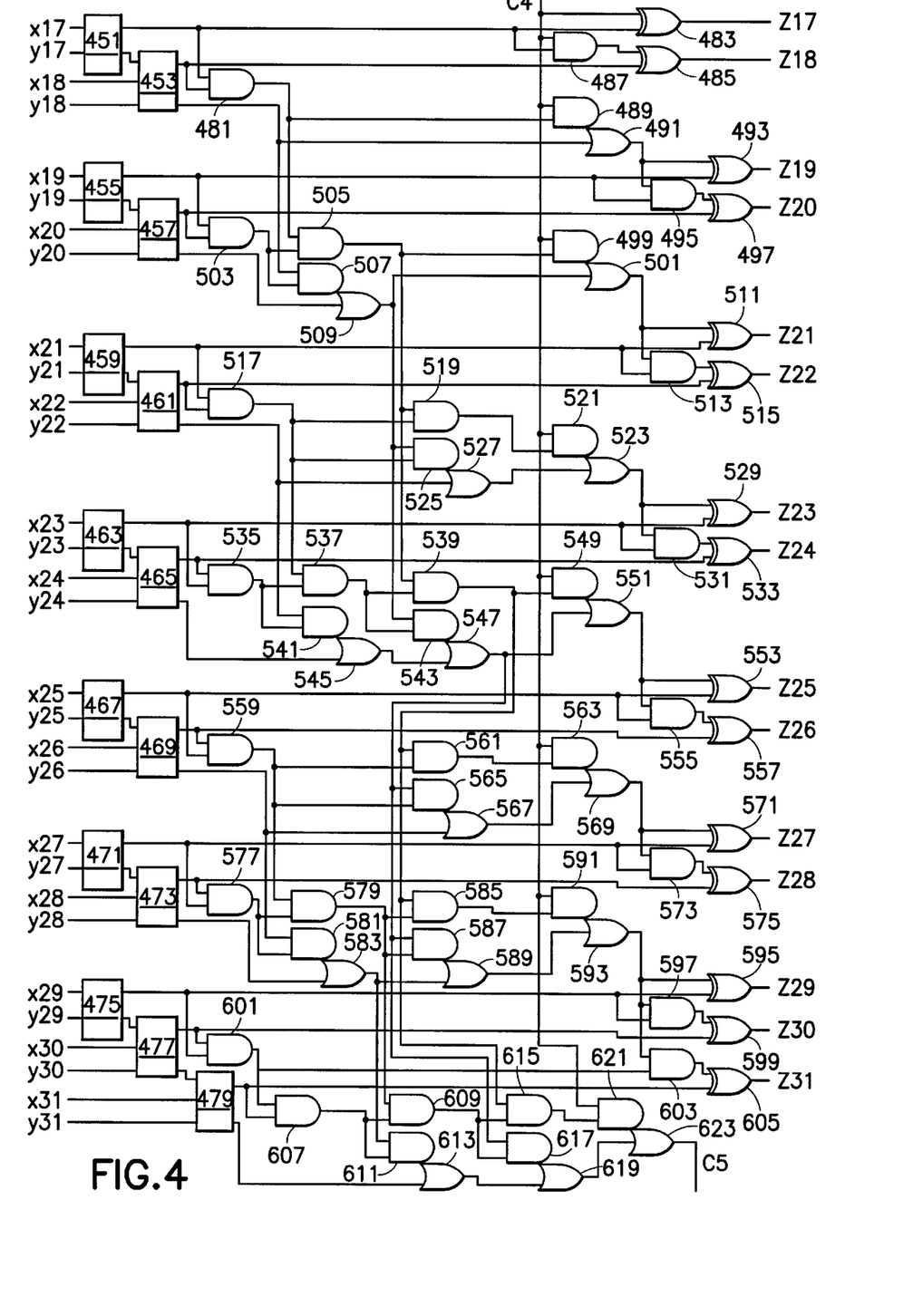
FIG. 4 is a circuit diagram for the three-stage carry skip adder.

A fifth class shown in FIG. 4 is a circuit that follows the circuit in FIG. 3. The fifth class includes three groups. A first group has two sets, a second group has two sets, and a third group has three sets. A first set of the first group includes a half adder 451 and a full adder 453 that constitute a ripple adder. A second set of the first group includes a half adder 455 and a full adder 457 that constitute a ripple adder. A first set of the second group includes a half adder 459 and a full adder 461 that constitute a ripple adder. A second set of the second group includes a half adder 463 and a full adder 465 that constitute a ripple adder. A first set of the third group includes a half adder 467 and a full adder 469 that constitute a ripple adder. A second set of the third group includes a half adder 471 and a full adder 473 that constitute a ripple adder. A third set of the third group includes a half adder 475 and full adders 477 and 479 that constitute a ripple adder.

An exclusive-OR circuit 483 receives the carry signal C4 from the fourth class and the output of the half adder 451, and outputs Z17. An AND circuit 481 also receives the carry signal C4 and the output of the half adder 451. An exclusive-OR circuit 485 receives the outputs of the AND circuit 481 and the full adder 453, and outputs Z18.

The outputs of the adders 451 and 453 of the first set are received by an AND circuit 481. The output of the AND circuit 481 and a carry of the full adder 453 are transmitted to the second set. An AND circuit 489, for receiving the outputs of the AND circuit 481 and the carry signal C4, and an OR circuit 491, for receiving the output of the AND circuit 489 and a carry of the full adder 453, are provided in order to generate a carry from the first class to the first set of the first group in the fifth class.

An exclusive-OR circuit 493 receives the outputs of the OR circuit 491 and the half adder 455, and outputs Z19. An AND circuit 495 also receives the outputs of the OR circuit 491 and the half adder 455. An exclusive-OR circuit 497 receives the outputs of the AND circuit 495 and the full adder 457, and outputs Z20.

The outputs of the adders 455 and 457 of the second set are received by an AND circuit 503. An AND circuit 507, for receiving the outputs of the AND circuit 503 and the full adder 453, and an OR circuit 509, for receiving the output of the AND circuit 507 and a carry of the full adder 457, are provided in order to generate a carry of the first group. Furthermore, an AND circuit 505 for receiving the outputs of the AND circuits 481 and 503 is provided in order to generate a signal indicating whether or not all the adders in the first group have output 1s. The outputs of the AND circuit 505 and the OR circuit 509 are transmitted to the second group.

An AND circuit 499, for receiving the carry signal C4 and the output of the AND circuit 505, and an OR circuit 501, for receiving the outputs of the AND circuit 499 and the OR circuit 509, are provided in order to generate a carry from the first class up to the first group of the fifth class. An exclusive-OR circuit 511 receives the outputs of the OR circuit 501 and the half adder 459, and outputs Z21. An AND circuit 513 also receives the outputs of the OR circuit 501 and the half adder 459. An exclusive-OR circuit 515 receives the outputs of the AND circuit 513 and the full adder 461 and outputs Z22.

The outputs of the adders 459 and 461 of the first set of the second group are input to an AND circuit 517. The output of the AND circuit 517 and a carry of the full adder 461 are transmitted to the second set of the second group.

An AND circuit 525, for receiving the outputs of the OR circuit 509 and the AND circuit 517, and an OR circuit 527, for receiving the output of the AND circuit 525 and the carry of the full adder 461, are provided in order to generate a carry up to the first set of the second group in the fifth class. Furthermore, an AND circuit 519, for receiving the outputs of the AND circuits 505 and 517, an AND circuit 521, for receiving the carry signal C4 and the output of the AND circuit 519, and an OR circuit 523, for receiving the outputs of the AND circuit 521 and the OR circuit 527, are provided in order to generate a carry up to the first set of the second group in the fifth class as a whole.

An exclusive-OR circuit 529 receives the outputs of the OR circuit 523 and the half adder 463, and outputs Z23. An AND circuit 531 also receives the outputs of the OR circuit 523 and the half adder 463. An exclusive-OR circuit 533 receives the outputs of the AND circuit 531 and the full adder 465, and outputs Z24.

The outputs of the adders 463 and 465 of the second set of the second group are input to an AND circuit 535. An AND circuit 541, for receiving the outputs of the AND circuit 535 and the full adder 461, and an OR circuit 545, for receiving the output of the AND circuit 541 and a carry of the full adder 465, are provided in order to generate a carry of the second group.

Furthermore, an AND circuit 537, for receiving the outputs of the AND circuits 517 and 535, an AND circuit 543, for receiving the output of the AND circuit 537 and the output of the OR circuit 509, which is the carry from the first group, and an OR circuit 547, for receiving the outputs of the AND circuit 543 and the OR circuit 545, are provided in order to generate a carry of the first and the second group. The output of the AND circuit 537 and the output of the AND circuit 505 in the first group are received by an AND circuit 539, and the outputs of the AND circuit 539 and the OR circuit 547 are transmitted to the third group.

In addition, an AND circuit 549, for receiving the output of the AND circuit 539 and the carry signal C4, and an OR circuit 551, for receiving the outputs of the AND circuit 549 and the OR circuit 547, are provided in order to generate a carry up to the second group in the fifth class as a whole.

An exclusive-OR circuit 553 receives the outputs of the OR circuit 551 and the half adder 467, and outputs Z25. An AND circuit 555 also receives the outputs of the OR circuit 551 and the half adder 467. An exclusive-OR circuit 557 receives the outputs of the AND circuit 555 and the full adder 469, and outputs Z26.

The outputs of the adders 467 and 469 of the first set of the third group are transmitted to an AND circuit 559. The output of the AND circuit 559 and a carry of the full adder 469 are transmitted to the second set. An AND circuit 565, for receiving the outputs of the AND circuit 559 and the OR circuit 547, and an OR circuit 567, for receiving the output of the AND circuit 565 and a carry of the full adder 469, are provided in order to generate a carry up to the first set of the third group in the fifth class.

Furthermore, an AND circuit 561, for receiving the outputs of the AND circuits 539 and 559, an AND circuit 563, for receiving the output of the AND circuit 561 and the carry signal C4, and an OR circuit 569, for receiving the outputs of the AND circuit 563 and the OR circuit 567, are provided in order to generate a carry up to the first set of the third group of the fifth class as a whole.

An exclusive-OR circuit 571 receives the outputs of the OR circuit 569 and the half adder 471, and outputs Z27. An AND circuit 573 also receives the outputs of the OR circuit 569 and the half adder 471. An exclusive-OR circuit 575 receives the outputs of the AND circuit 573 and the full adder 473, and outputs Z28.

The outputs of the adders 471 and 473 of the second set of the third group are transmitted to the AND circuit 577. An AND circuit 581, for receiving the output of the AND circuit 577 and a carry of the full adder 469, and an OR circuit 583, for receiving the output of the AND circuit 581 and a carry of the full adder 473, are provided in order to generate a carry up to the second set in the third group. Further, an AND circuit 579, for receiving the outputs of the AND circuits 559 and 577, an AND circuit 587, for receiving the output of the AND circuit 579 and the output of the OR circuit 547, which is a carry from the second group, and an OR circuit 589, for receiving the outputs of the AND circuit 587 and the OR circuit 583, are provided in order to generate a carry up to the second set of the third group in the fifth class.

Furthermore, an AND circuit 585, for receiving the output of the AND circuit 539 from the second group and the output of the AND circuit 579, an AND circuit 591, for receiving the output of the AND circuit 585 and the carry signal C4, and an OR circuit 593, for receiving the outputs of the AND circuits 591 and the OR circuit 589, are provided in order to generate a carry up to the second set of the third group as a whole.

An exclusive-OR circuit 595 receives the outputs of the OR circuit 593 and the half adder 475, and outputs Z29. An AND circuit 597 also receives the outputs of the OR circuit 593 and the half adder 475. An exclusive-OR circuit 599 receives the outputs of the AND circuit 597 and the full adder 477, and outputs Z30. An AND circuit 601 receives the outputs of the adders 475 and 477. An AND circuit 603 receives the outputs of the AND circuit 601 and the OR circuit 593. An exclusive-OR circuit 605 receives the outputs of the AND circuit 603 and the full adder 479, and outputs Z31.

An AND circuit 607 for receiving the outputs of the AND circuit 601 and the full adder 479 is provided in order to generate a signal indicating whether or not all the adders in the third set of the third group have output 1s. In addition, an AND circuit 611, for receiving the output of the AND circuit 607 and the output of the OR circuit 583, which is a carry from the second set, and an OR circuit 613, for receiving the output of the AND circuit 611 and a carry of the full adder 479, are provided in order to generate a carry of the third group.

Furthermore, an AND circuit 609, for receiving the outputs of the AND circuits 579 and 607, an AND circuit 617, for receiving the output of the AND circuit 609 and the output of the OR circuit 547, which is a carry from the second group, and an OR circuit 619, for receiving the outputs of the AND circuit 617 and the OR circuit 613, are provided in order to generate a carry in the fifth class.

Further, an AND circuit 615, for receiving the outputs of the AND circuits 539 and 609, an AND circuit 621 for receiving the output of the AND circuit 615 and the carry signal C4, and an OR circuit 623, for receiving the outputs of the AND circuit 621 and the OR circuit 619, are provided in order to generate a carry signal C5 of the fifth class as a whole.

The above arrangement is for a circuit having 32 bits, and by employing the previously mentioned block division method, the circuit shown in FIG. 4 can be provided.

In the circuit in FIGS. 3 and 4, the full adder 301 and other half adders begin addition without taking preceding carries into account, and addition using the ripple carry method is performed in the first and the second classes and the individual sets in the third and following classes. Then, the exclusive-OR, AND and OR circuits perform their processing and generate the results.

It should be noted in FIGS. 3 and 4 that a carry signal C1 of a specific set, a carry C0 associated with the immediately preceding set of the specific set, and a signal F1 indicating whether all the adders in the specific set have output 1s are prepared, and AND circuits and OR circuits are provided to generate a signal C2=C1+F1*C0. It should also be noted that when a carry signal C associated with a set that is two or more levels lower than the specific set is transmitted from that lower set to the specific set, AND circuits and OR circuits are employed to generate a signal C3=C2+F2*C, where a signal F2 indicates whether or not all the adders in sets that are higher than that lower set and are equal to or lower than the specific set have output 1s. It should also be noted that, since there is a third skipped carry signal, when a carry signal C associated with a set two or more levels lower than a specific set is transmitted from the two or more lower set to the specific set, AND circuits and OR circuits generate a signal C4=C3+F2*C, where F2 denotes a signal indicating whether or not all the adders in sets that are higher than the two or more lower set and are equal to or lower than the specific set have output 1s.

For the arrangements in FIGS. 3 and 4 are described using positive logic, but can be described using negative logic. In this case, AND and OR circuits would be replaced with NAND and NOR circuits. Further, a circuit other than that shown in FIGS. 3 and 4 can perform substantially the same processing, and the above expressions may also be modified so long as substantially the same processing can be performed.

The thus structured three-stage carry skip adder, the total gate delay is (n+7) where n satisfies bit count N≦n(n+1)(n+2)(n+3)/24+n(n+1)/2+2n+5. Therefore, the three-stage carry skip adder has gate delay 18 for 1024 bits and has gate delay 21 for 2048 bits.

The relationship between n and N is shown below.

| n | N |
|---|---|
| 1 | 9 |
| 2 | 17 |
| 3 | 32 |
| 4 | 58 |
| 5 | 100 |
| 6 | 164 |
| 7 | 257 |
| 8 | 387 |
| 9 | 563 |
| 10 | 795 |
| 11 | 1094 |
| 12 | 1942 |
| 13 | 2518 |
| 14 | 3215 |
| 15 | 4049 |
| 16 | 7925 |

C. Four-stage Carry Skip Adder

By using the above description, four-stage carry skip adder can also be constructed. The block division method is shown below.

```
       3
       --
       2
       ---
     2, 2
     -----
     2, 2
     2, 2
     2, 2
     2, 2
     -----
     2, 2
     2, 2
     2, 2
     2, 2
     2, 2
     2, 2
   2, 2, 3
   --------
     2, 2
     2, 2
     2, 2
     2, 2
     2, 2
```

-continued 2, 2
2, 2, 3
2, 2
2, 2
2, 2, 3
2, 2, 3, 4
---------
2, 2
2, 2
2, 2
2, 2
2, 2
2, 2
2, 2, 3
2, 2
2, 2
2, 2, 3
2, 2, 3, 4
2, 2
2, 2
2, 2, 3
2, 2, 3, 4
2, 2, 3, 4, 5
----------

The highest class level is denoted by broken horizontal lines, and the second highest class level is denoted by the insertion of a blank line. The third highest class level is denoted by lines, and the lowest class level is denoted by the individual numerals. The numerals indicate the number of adders included in a ripple adder.

In this case, gate delay is (n+9) where n satisfies bit count $N \leq n(n+1)(n+2)(n+3)(n+4)/120+n(n+1)(n+2)/6+n(n+1)+5n+7$. Therefore, gate delay is 17 for 1024 bits, and 19 for 2048 bits. The relationship between n and N is shown below.

| n | N |
|---|---|
| 1 | 16 |
| 2 | 33 |
| 3 | 65 |
| 4 | 123 |
| 5 | 164 |
| 6 | 387 |
| 7 | 644 |
| 8 | 1031 |
| 9 | 1594 |
| 10 | 2389 |
| 11 | 3483 |
| 12 | 4955 |

D. Five-stage Carry Skip Adder

The block division method of the five-stage carry skip adder is shown below.

3
--
2
---
2, 2
----
2, 2
2, 2
2, 2
2, 2
-----

-continued 2, 2
2, 2
2, 2
2, 2
2, 2
2, 2
2, 2
2, 2
2, 2
2, 2
2, 2
2, 2
2, 2
2, 2
2, 2, 3
--------
2, 2
2, 2
2, 2
2, 2
2, 2
2, 2
2, 2
2, 2
2, 2
2, 2
2, 2
2, 2
2, 2, 3
2, 2
2, 2
2, 2
2, 2
2, 2
2, 2
2, 2, 3
2, 2
2, 2
2, 2, 3
2, 2, 3, 4
---------
2, 2
2, 2
2, 2
2, 2
2, 2
2, 2
2, 2
2, 2
2, 2
2, 2
2, 2, 3
2, 2
2, 2
2, 2
2, 2
2, 2
2, 2
2, 2, 3
2, 2
2, 2, 3
2, 2, 3, 4
2, 2
2, 2
2, 2
2, 2
2, 2
2, 2
2, 2, 3
2, 2
2, 2
2, 2
2, 2
2, 2, 3
2, 2, 3, 4
2, 2

2, 2
2, 2, 3, 4
2, 2, 3, 4, 5

In this case, the gate delay is (n+11), where n satisfies bit count $N \leq n(n+1)(n+2)(n+3)(n+4)(n+5)/720+n(n+1)(n+2)(n+3)/24+n(n+1)(n+2)/3+5n(n+1)/2+7n+9$.

Therefore, the gate delay is 18 for 1024 bits, and 19 for 8 bits. The relationship between n and N is shown below.

| n | N |
|---|---|
| 1 | 25 |
| 2 | 58 |
| 3 | 123 |
| 4 | 246 |
| 5 | 469 |
| 6 | 856 |
| 7 | 1500 |
| 8 | 2531 |
| 9 | 4125 |
| 10 | 6514 |

Although carry skipping can be performed at more stages, as this increases the size of a circuit, it is not practical. While the maximum speed for four-stage skipping is attained at the 1024 bit level, the number of stages should be determined by performing a trade off involving the circuit size and the performance.

Generally, assuming that a bit count is N and the depth of carry skips is x, N is calculated that satisfies:

$$N \leq n(n+1) \ldots (n+x)/((x+1)!) \quad (1),$$

and (n+2x+1) is a gate delay. Actually, a correction term having a lower order is inserted in the relationship between N and n; but the first term is important for a long binary adder in this invention, and an approximate value is employed to calculate the expression. When the value of x is changed, an x can be provided with which a minimum gate delay is obtained. Generally, when N is determined, x and n with which a gate delay is minimized can be unconditionally determined. This relationship can be acquired as follows.

Figure 5:
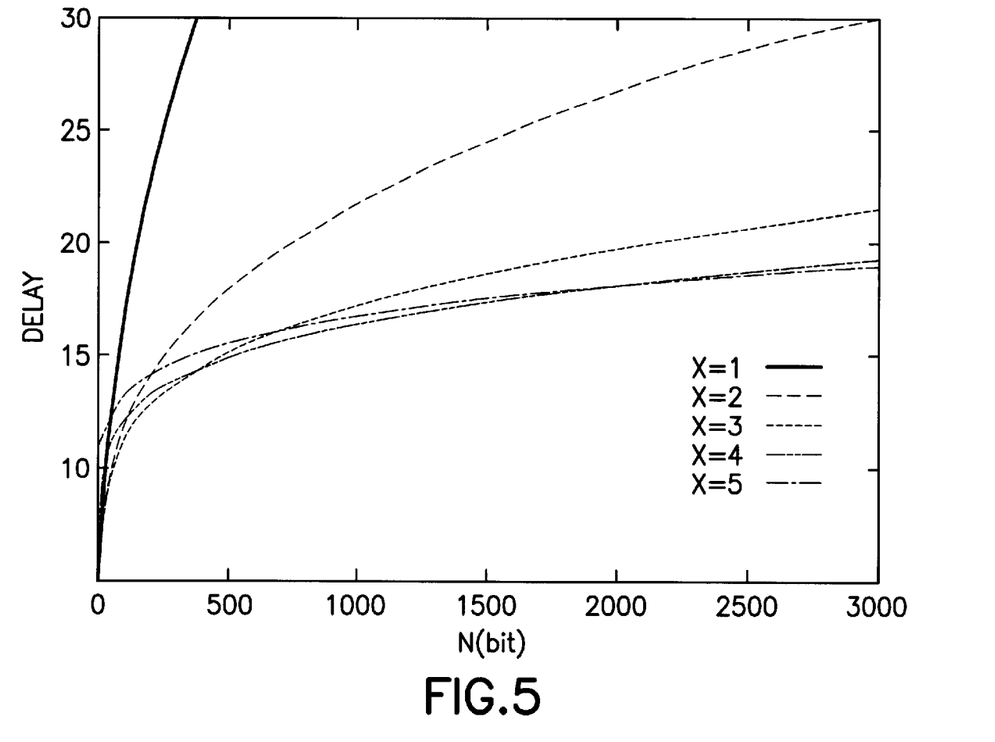
FIG. 5 is a graph showing the relationship between a gate delay and a bit count.

Since d=n+2x+1, where d denotes a gate delay, n=d−2x−1. On an optimal curve, even if x is changed to x+1, there is a portion where the value d is constant. This is clearly apparent because in a graph showing a relationship between N and a delay when carry skipping is performed, there is an intersection of two curves (see FIG. 5).

For x and x+1, expression (1) is stated as follows, with N when x is employed being defined as N1, and N when x+1 is employed being defined as N2.

[Expression 1]

$$\begin{cases} N1 \leq \dfrac{(d-2x-1)(d-2x)\cdots(d-x-1)}{(x+1)!} \\ N2 \leq \dfrac{(d-2x-3)(d-2x-2)\cdots(d-x-2)}{(x+2)!} \end{cases}$$

Since at the previous intersection N1 and N2 are equal,

[Expression 2]

$$\dfrac{(d-2x-1)(d-2x)\cdots(d-x-1)}{(x+1)!} = \dfrac{(d-2x-3)(d-2x-2)\cdots(d-x-2)}{(x+2)!}$$

When the expression 2 is calculated for d, $d^2-(5x+7)d+(5x^2+13x+8)=0$.

When this equation is calculated further, the following expression, for which the solution is a positive number, can be obtained.

[Expression 3]

$$d = \dfrac{1}{2}\left((5x+7) + \sqrt{5x^2+18x+17}\right)$$

Therefore,

[Expression 4]

$$n = \dfrac{1}{2}\left((x+5) + \sqrt{5x^2+18x+17}\right)$$

This is the relationship between the depth of a carry skip and the optimal n. This n is substituted into the expression (1), and the length of the binary adder, N, is set to N=f(x). The relationship existing among x, n and N is shown below.

| x | n | N |
|---|---|---|
| 0 | 4 | 4 |
| 1 | 6 | 22 |
| 2 | 7 | 94 |
| 3 | 9 | 563 |
| 4 | 11 | 3483 |
| 5 | 12 | 14952 |

Therefore, it is apparent that the highest speed for a 4 bit binary adder is provided by a zero carry skip; for an 8 or 16 bit binary adder, a one-stage carry skip; for a 32 or 64 bit binary adder, a two-stage carry skip; for a 128 or 256 bit binary adder, a three-stage carry skip; and for a 1024 or 2048 bit binary adder, a four-stage carry skip.

The above explanation has been given for only adders, but a multiplier can be provided by employing a combination of a Wallace tree and a modification of the above described carry skip adder. In the Wallace tree portion, a term sequence for output is set in a predetermined pattern, and the carry skip adder adds the output of the Wallace tree with a minimum of delay. The adder is divided into three sections, and the individual sections of the adder will now be explained.

(a) A Term Sequence for Output of the Wallace Tree

Since the value for two n-bit inputs of an n-bit multiplier is $2^n-1$ at the maximum, the square of this value is the maximum value that the multiplier can produced. The maximum value is $(2^n-1) \times (2^n-1) = 2^{2n}-2^{n+1}+1$.

This equation is modified as follows.

$2^{2n}-2^{n+1}+1=(2^{2n-1}-1)+(2^{2n-1}-2^{n+1}-2)+4$

Figure 6:
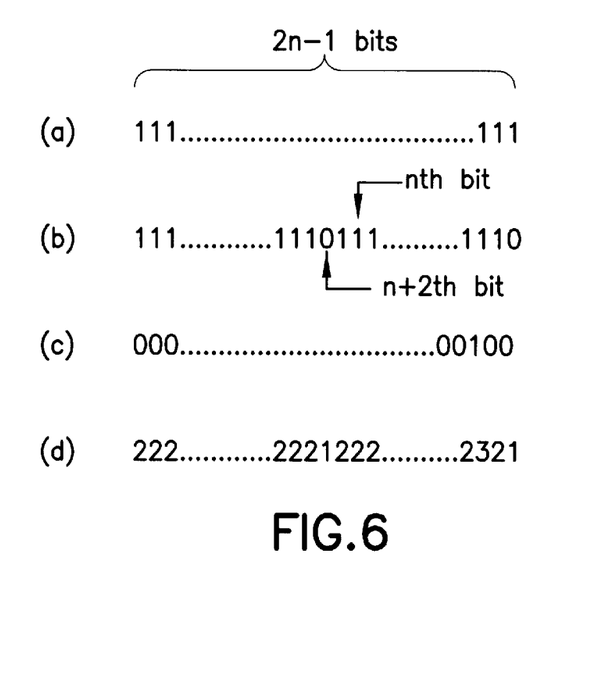
FIG. 6 is a diagram for explaining the output term count of the Wallace tree.

The result obtained by the calculation is interpreted as follows. In the first term, all (2n−1) bits are "1." This is the state shown in FIG. 6(a). In the second term, the (n+2)-th bit from the LSB is "0," and the LSB is "0." This is the state shown in FIG. 6(b). The third term is 4, which is the state shown in FIG. 6(c). When these results are added together, a term sequence shown in FIG. 6(d) is acquired. This is a designated term sequence according to the present invention. Hereinafter this term sequence is referred to as Wn.

To fabricate a multiplier, first, product terms are prepared relative to all bit combinations of a multiplier and a multiplicand, which are binary numbers, and are arranged by aligning their digits. The product terms are so arranged that a natural number monotonically increases to n, and then monotonically decreases, as in the sequence 1, 2, 3, 4, ..., n−1, n, n−1, n−2, ... 3, 2, 1. When a full adder acts on the product terms, the number of bits at the same level are reduced by a geometric series of ⅓, and carries equivalent to the number of outputs sequentially appear on one bit of the MSB side. While the symmetric triangular shape of the product terms is gradually shifted toward the MSB, it is flattened each time through the full adders, and is changed to a term sequence of Wn. To obtain Wn, the Wallace tree is prepared using the following procedures.

(1) The lowest level at which the number of terms are 3, 2 or 1 is unchanged.
(2) When the number of terms is three or more and is 3x+a (a=0, 1, 2), x full adders are connected to reduce the number of terms at the digit to x+a, and to send x carries that occurs at this time to the upper digit.
(3) The processing is terminated when the full adders are no longer necessary. In other cases, the processing is returned to (2).

(b) Divisions of an Adder

The output Wn of the thus prepared Wallace tree is employed to divide terms from the LSB to the MSB into three segments, and different system circuits perform addition for the respective segments. A first adder portion extends from the LSB to the second lowest term, and the number of terms is 1 or 2. A second adder portion extends from the third lowest term to the (n+2)-th term, the number of the terms at the highest level being 1, and the number of terms at the lowest level being 3. A third adder portion extends from the (n+3)-th term to the (2n+1)-th term. The first to the third adders will now be described.

(b1) First Adder

Since the term count of the LSB of the first adder is 1, the term is output unchanged. And since the number of the second term is 2, the terms are added together by the half adder, and a carry is transmitted to the second adder.

(b2) Second Adder

The previously described multi-stage carry skip adder recursively iterates, a number of times equivalent to the number of stages, calculations for adding without taking carries into account, and correcting the result by +1 when a carry is generated after the addition. When the number of terms is equal to or smaller than 2, either an increment by one as compensation or no compensation is performed. Therefore, only one +1 compensator (a 1-incrementer) set is required. The reason is as follows. The maximum value provided by the addition for a term count of 2 is obtained when all bits (n bits) of the two values are "1." The maximum value obtained by adding these values is $(2^n-1)+(2^n-1)+carry=2^{n+1}-2+carry$, and is smaller than $2^{n+1}$. As a result, only one final carry is generated. In other words, a carry generated by a local ripple adder and a skipped carry are exclusively 1. It should be noted that the condition for activating the +1 compensator is complicated as a consequence of the multiple stages involved.

For the second adder, the lowest level has a term count of 3. The maximum value is calculated as $$(2^n-1)+(2^n-1)+carry1+carry2=2^{n+1}-2+carry1+carry2.$$

Not only a carry generated by a local ripple adder but also a skipped carry may be "1." That is, the two carries are independently generated. Therefore, the two carries must be added together at the edges of blocks of the adder, instead of following the OR procedure. Specifically, at the highest level of the block in the ripple adder, a carry generated at that level, a carry skipped from a lower level, and the LSB of an adder at the following stage are added together by a full adder, and a carry generated by the full adder is employed to activate the +1 compensator. A delay between the blocks of the ripple adder is extended to 2.

Figure 7:
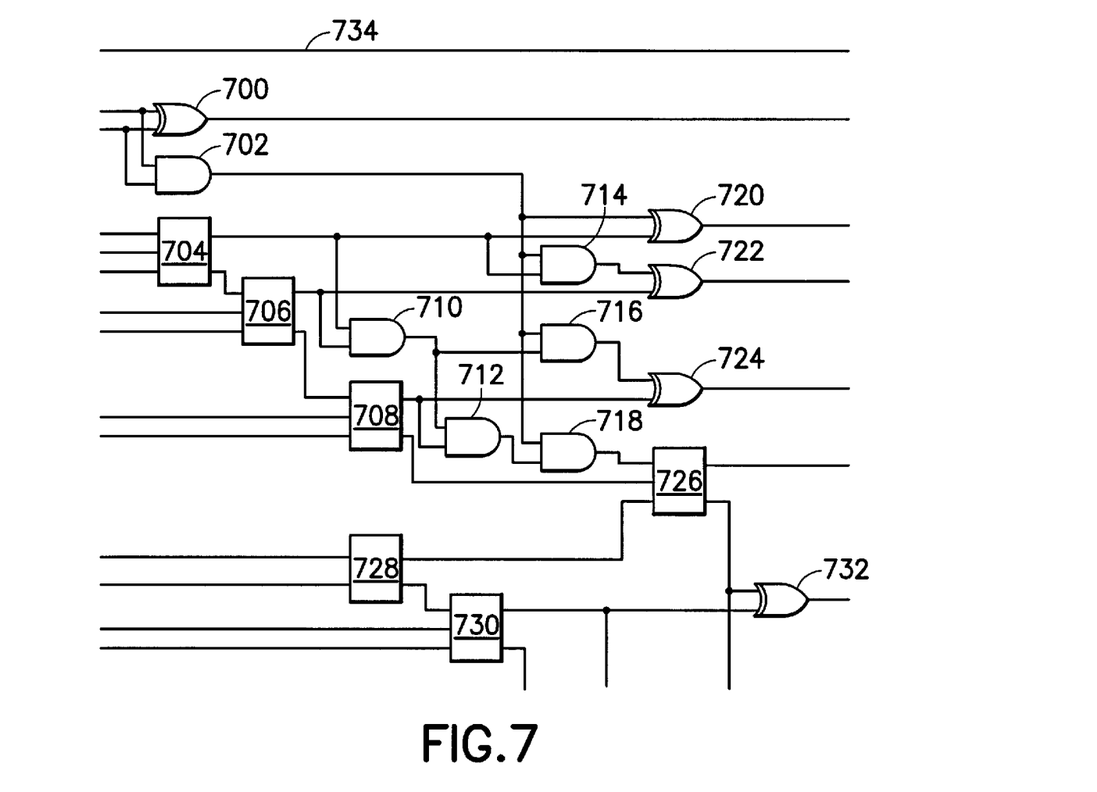
FIG. 7 is a circuit diagram illustrating a first adder and the lower level portion of a second adder in the multiplier according to the present invention.

To explain the compensator, the blocks of the first ripple adders including the first and the second adders are shown in FIG. 7. The first adder includes a least significant term line 734, an AND circuit 702 that is a half adder, and an exclusive-OR circuit 700. A carry of the half adder is transmitted to the first ripple adder in the second adder. The LSB of the second adder has a term count of 3, and the input terminals from the Wallace tree are connected to a full adder 704. The output of the full adder 704 and the carry of the half adder in the first adder are input to an exclusive-OR circuit 720, which in turn outputs a third bit. The next input of the second adder has a term count of 2, and is transmitted with the carry of the full adder 704 to a full adder 706. The outputs of the full adder 704 and the half adder of the first adder are transmitted to an AND circuit 714, and the outputs of the AND circuit 714 and the full adder 706 are transmitted to an exclusive-OR circuit 722, which in turn outputs a fourth bit. The input for the third term of the second adder has a term count of 2, and is transmitted with the carry of the full adder 706 to a full adder 708. The outputs of the full adders 704 and 706 are transmitted to an AND circuit 710, and the output of the AND circuit 710 and a carry from the half adder in the first adder are transmitted to an AND circuit 716. The outputs of the AND circuit 716 and the full adder 708 are transmitted to an exclusive-OR circuit 724, which in turn outputs a fifth bit. The outputs of the AND circuit 710 and the full adder 708 are also transmitted to an AND circuit 712. The output of the AND circuit 712 and a carry of the half adder in the first adder are transmitted to an AND circuit 718.

The input for the fourth term of the second adder has a term count of 2, and is the second block of the ripple adder, so that there is no carry from the preceding full adder. The input of the fourth term of the second adder is therefore transmitted to a half adder 728. The output of the half adder 728 along with a carry from the full adder 708 and the output of the AND circuit 718 is transmitted to a full adder 726. The full adder 726 outputs a sixth bit and a carry is delivered to the second block of the ripple adder. The input for the fifth term of the second adder has a term count of 2, and is transmitted with a carry of the half adder 728 to a full adder 730. The output of the full adder 730 and a carry of the full adder 726 are transmitted to an exclusive-OR circuit 732, which in turn outputs a seventh bit. A carry to be transmitted to the block of the following ripple adder is generated by the full adder 726.

Since a delay 2 occurs between the blocks of the ripple adder, as described above, a delay for the ripple adder in the next block is greater by 2 than that for the preceding stage.

For a two-carry one-skip adder, the block sizes of ripple adders are as follows:

2, 2, 4, 6, 8, 10, 12, . . .

For a two-carry two-skip adder, the block sizes of ripple adders are

2, 2
    2, 2, 3, 4
    2, 2, 3, 4, 5, 6
    2, 2, 3, 4, 5, 6, 7, 8

In a two-carry multiple-skip adder, for the outermost skip, a carry generated by a full adder is transmitted to a ripple adder in the next stage, and for the other internal skips, a carry is generated by a circuit, including an OR circuit (a circuit represented by $C2=C1+F1*C0$), in the same manner as in the first example.

(b3) Third Adder

Since the input of the most significant bit of the second adder has a term count of 1, a one-carry multiple-skip adder that was explained first can be employed as the third adder.

Figure 8:
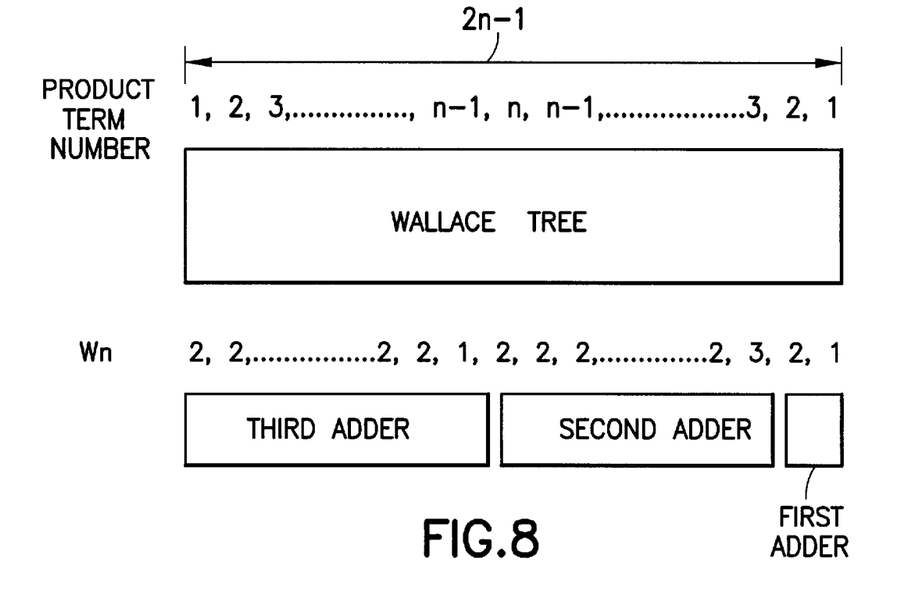
FIG. 8 is a block diagram illustrating the multiplier of the present invention.

With the above described arrangement, a portion wherein the number of terms to be input is increased beginning with the LSB of the input for the Wallace tree, and a delay due to the Wallace tree is increased corresponds to the first and the second adders, and a portion wherein the number of input terms for the Wallace tree is reduced and a delay due to the Wallace tree is shortened corresponds to the third adder that has a smaller delay, so that a faster multiplier can be provided. The outline of the arrangement of the multiplier is shown in FIG. 8.

While there have been shown and described what are at present considered the preferred embodiments of the invention, it will be obvious to these skilled in the art that various changes and modifications may be made therein without departing from the scope of the invention as defined by the appended claims.

What is claimed is:

1. A two-stage carry skip adder, comprising:

two N-bit inputs, said N-bit inputs divided, from a lower level, into a first group having three bits, a second group having two bits, a third group having two 2-bit sets, and a fourth and following groups, wherein an n-th group (n is an integer of 4 or more) has n−1 sets, and in said n-th group, a first and a second set has two bits each, and an m-th set (m is an integer of 3 or more) has m bits;

N adders, each said adder connected to two input at the same bit positions of said two N-bit inputs, and having a sum output and a carry output;

a line for directly transmitting a ripple carry from one of said N adders to a succeeding one of said N adders in said first and second groups and in each said set;

a line for transmitting a carry from a set to a succeeding set in each said group of said third group and following groups;

a line for transmitting a carry from a group to a succeeding group in each said group of said second group and following groups; and a circuit for correcting said sum output of said N adders by using a transmitted carry from a previous set, a transmitted carry from a previous group, and said sum output.

2. A three-stage carry skip adder, comprising:

two N-bit inputs, said N-bit inputs divided into, from a lower level, a first class having three bits, a second class having two bits, a third class having two 2-bit groups, a fourth class having a first group having two 2-bit sets and a second group having two 2-bit sets, a fifth class having a first group having two 2-bit sets, a second group having two 2-bit sets and a third group having two 2-bit sets and a 3-bit set, a sixth and following classes, wherein an n-th class (n is an integer of 6 or more) has n−2 groups, and in said n-th class, a first and second and third groups are the same as the respective groups in said fifth class, and a g-th group (g is an integer of 4 or more) has g sets, and in said g-th group, a first set has two bits and an s-th set (s is an integer of 2 or more) has s bits;

N adders, each said adder connected to two input at the same bit positions of said two N-bit inputs, and having a sum output and a carry output;

a line for directly transmitting a ripple carry from one of said N adders to a succeeding one of said N adders in said first and second classes and in each said group of said third class, and in each said set;

a line for transmitting a carry from a set to a next set in each said group of said third and following classes;

a line for transmitting a carry from a group to a next group in each said class of said fourth and following classes;

a line for transmitting a carry from a class to a next class in each said class of said second and following classes; and a circuit for correcting said sum output of said N adders by using a transmitted carry from a previous set, a transmitted carry from a previous group, a transmitted carry from a previous class, and said sum output.

3. A four-stage carry skip adder, comprising:

two N-bit inputs, said N-bit input divided into, from a lower level, a first block having three bits, a second block having two bits, a third block having two 2-bit sets, a fourth block having two classes each comprising two groups composed of two 2-bit sets each, a fifth and following blocks, wherein an b-th block (b is an integer of 5 or more) has b−2 classes, and in said b-th block, classes up to a b−3-th class are the same as corresponding classes in the previous block, and a b−2-th class has b−2 groups, and in b−2-th class, a first group has two 2-bit sets, a second group has two 2-bit sets and a g-th group (g is an integer of 3 or more) has g sets, and in said g-th group, a first set has two bits and an s-th set (s is an integer of 2 or more) has s bits;

N adders, each said adder connected to two input at the same bit positions of said two N-bit inputs and having a sum output and a carry output;

a line for directly transmitting a ripple carry from one of said N adders to a succeeding one of said N adders in said first and said second blocks and in each said set of said third and following blocks;

a line for transmitting a carry from a set to a succeeding set in said third block and in each said group of said fourth and following blocks;

a line for transmitting a carry from a group to a succeeding group in each said class of said fourth and following blocks;

a line for transmitting a carry from a class to a succeeding class in each of said fourth and following blocks;

a line for transmitting a carry from a block to a succeeding block in each of said second and following blocks; and a circuit for correcting said sum output of said N adders by using a transmitted carry from a previous set, a transmitted carry from a previous group, a transmitted carry from a previous class, a transmitted carry from a previous block, and said sum output.

* * * * *